April 3, 1956   E. E. HALLBERG ET AL   2,740,383
CONTROL MECHANISM FOR MACHINE TOOLS
Filed Feb. 10, 1951   3 Sheets-Sheet 3
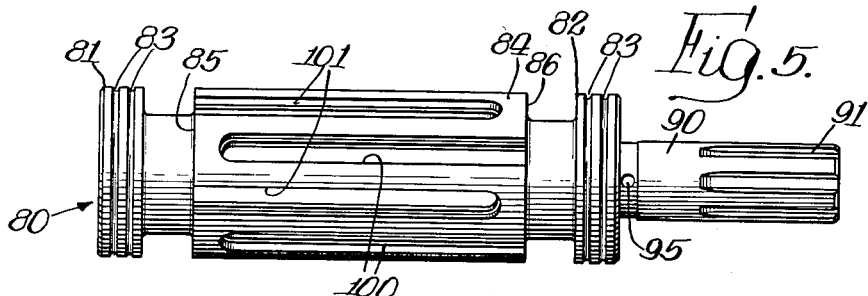
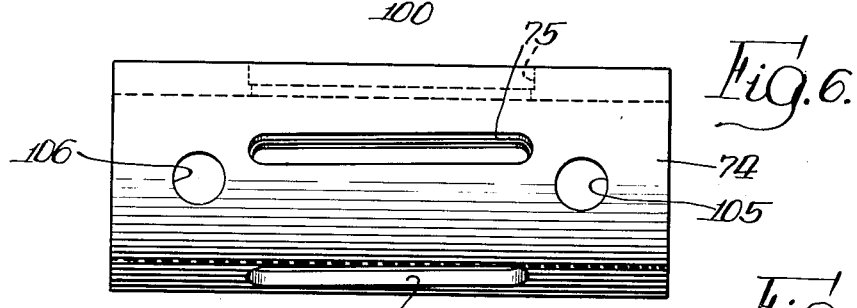
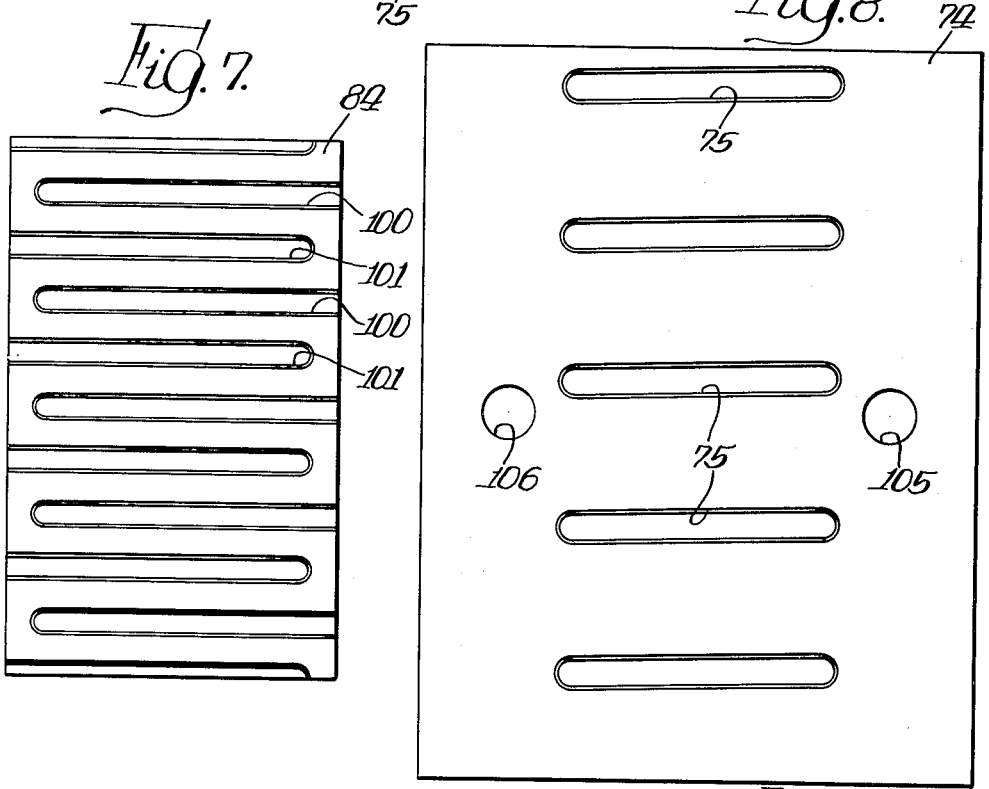
Inventors:-
Elmer E. Hallberg,
Stanley A. Bjorklund,
BY Schroeder, Merriam,
Hofgren, & Bradly
Attys.

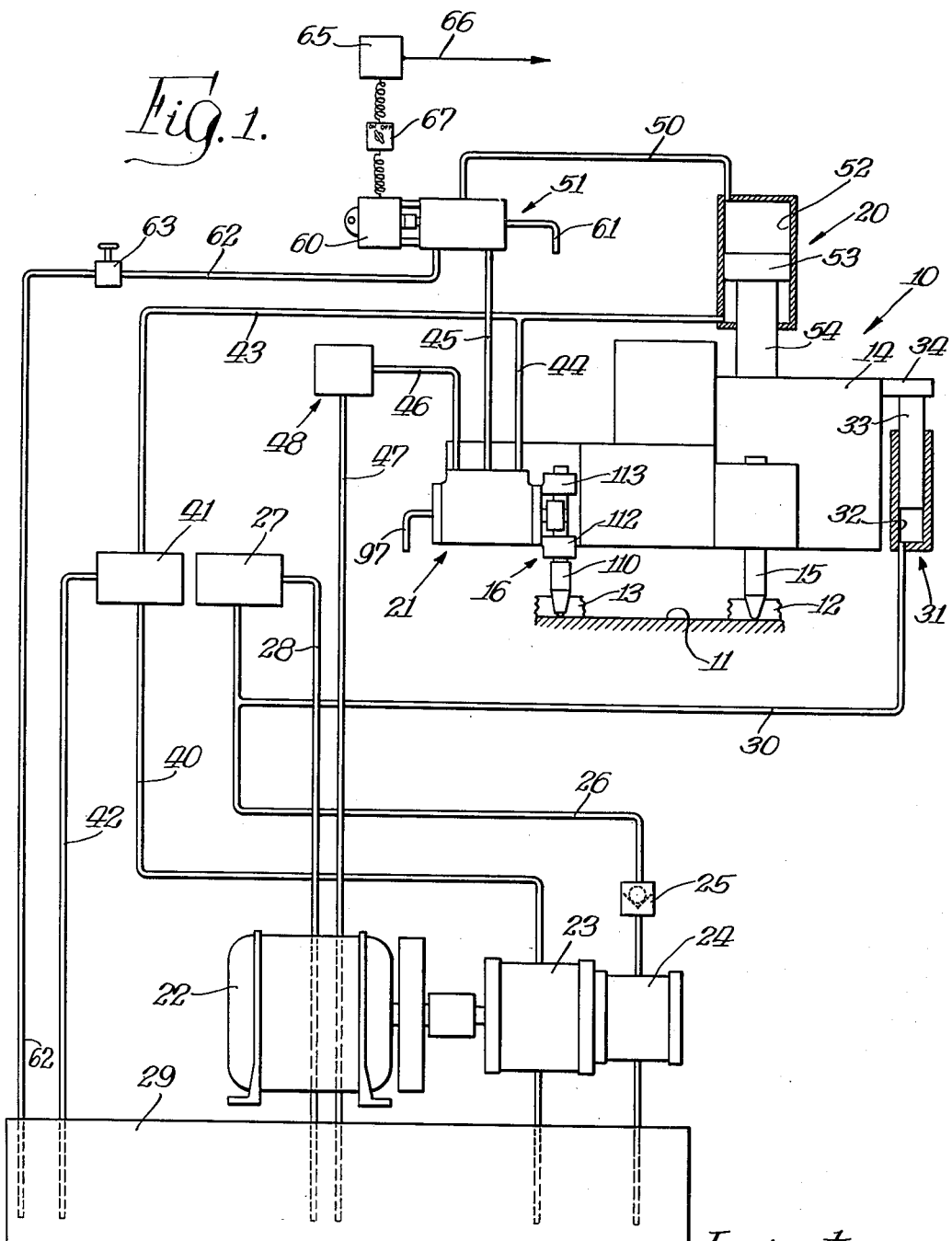

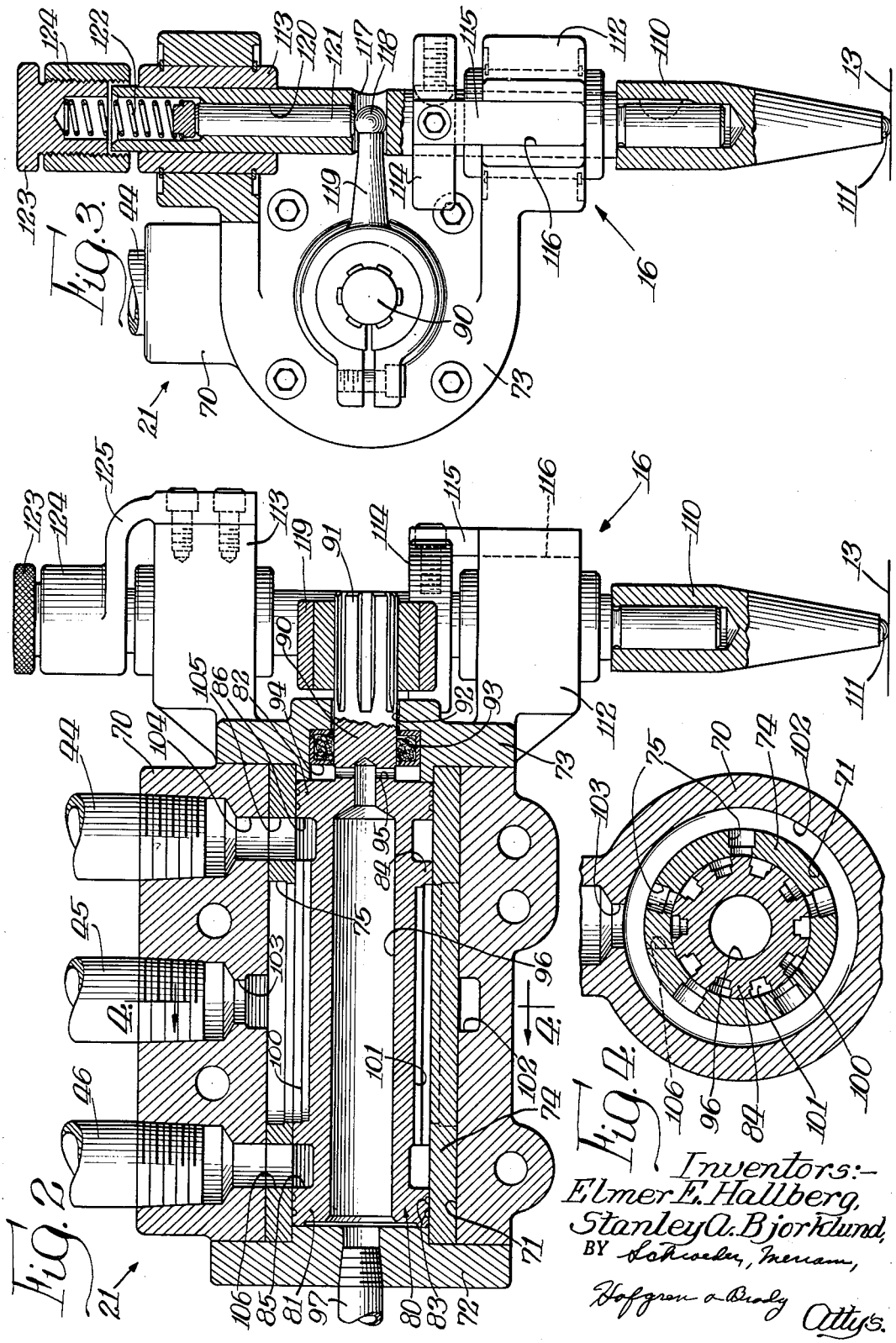

United States Patent Office 2,740,383
Patented Apr. 3, 1956

2,740,383

CONTROL MECHANISM FOR MACHINE TOOLS

Elmer E. Hallberg and Stanley A. Bjorklund, Rockford, Ill., assignors to Rockford Machine Tool Co., a corporation of Illinois Application February 10, 1951, Serial No. 210,416

4 Claims. (Cl. 121—45)

This invention relates to control mechanism and more particularly to control mechanism for machine tools.

It is the general object of this invention to produce a new and improved control mechanism.

It is a more specific object of this invention to produce a control system for a pattern controlled machine tool.

Another object of the invention is to produce a tracer control mechanism for adjustment of a cutting tool including means responsive to movements of the tracer for moving the cutting tool relative to the work piece.

A further object of the invention is to produce a hydraulic control circuit for a tracer controlled machine tool which includes a piston and cylinder device for moving the tool relative to the work piece in which pressure is constantly directed to one side of the piston in a direction biasing the tool toward movement away from the work piece and in which pressure is metered to the head end of the piston to move the tool toward the work piece, and to provide in such a circuit an accurately controllable valve for bleeding off pressure from the head end of the piston in various degrees as determined by movement of a tracer mechanism in order to effect movement of the tool toward and away from the work piece in response to movements of the tracer.

A further object of the invention is to produce a hydraulic circuit in a tracer controlled machine tool which includes electrical means effective to cause movement of the tool away from the work piece at the end of a working stroke and to lower the tool into cutting position at the end of the return stroke, the apparatus being so arranged that failure of the electrical circuit will cause the machine tool to fail in a safe position, that is in a position with the tool separated from the work piece.

A further object is to produce a duplicator valve particularly adaptable for use in conjunction with tracer controlled machine tools, which valve may be secured to the tracer mechanism of such a tool to control the pressure directed to one end of a hydraulic piston and cylinder device operable to raise and lower the tool.

A further object of the invention is to produce a duplicator valve of the type described in the preceding paragraph which is provided with a rotor and a sleeve, there being a plurality of grooves in the rotor adapted to be matched into overlapping relationship with slots in the sleeve, the slots and grooves being so arranged as to produce orifices through which the control fluid is delivered to the piston and cylinder device or to a tank, the size of the orifices being capable of accurate adjustment with movement of the tracer in order accurately to control the tool.

Other and further objects of the invention will be readily apparent from the following description and drawings, in which:

Fig. 1 is a diagrammatic view of a machine tool and the hydraulic circuit of this invention;

Fig. 2 is a longitudinal section through the duplicator valve of this invention showing the valve used in conjunction with the tracer mechanism;

Fig. 3 is a front elevation, partly in section, of the tracer control mechanism and showing its mode of attachment to the duplicator valve;

Fig. 4 is a vertical transverse section through the duplicator valve taken along line 4—4 of Fig. 2;

Figs. 5 and 6 are elevational views of the rotor and sleeve respectively of the duplicator valve; and Figs. 7 and 8 are developed views showing the construction of the grooves in the rotor and the slots in the sleeves respectively.

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated. The scope of the invention will be pointed out in the appended claims.

Referring now to Fig. 1, there is shown, diagrammatically, a machine tool 10 having a slide 11 which carries a work piece 12 and a pattern or template 13. The machine tool includes a second slide 14 which may be reciprocated relative to the first slide, the second slide carrying a tool 15 for performing the desired cutting operation on the work piece and a tracer mechanism 16 which rides on the template to control the tool.

A hydraulic piston and cylinder device 20 is provided for raising and lowering the tool slide 14 relative to the work piece slide 11 as the tool slide is reciprocated relative to the work piece slide. The tracer mechanism 16 is connected to a duplicator valve 21 for controlling the supply of fluid to the piston and cylinder device 20 to effect movement of the tool.

The hydraulic circuit includes a motor 22 for driving a main pressure pump 23 and a pilot pressure pump 24. The latter pump is connected through a check valve 25 and conduit 26 to a pressure relief valve 27, which in turn is connected by means of a conduit 28 to a tank 29. The conduit 26 is connected to another conduit 30 which opens into one end of a counterbalancing piston and cylinder device 31. The device 31 includes a cylinder 32 having a piston 33 reciprocable therein, the piston being connected by means of an arm 34 to the tool slide 14. The effective pressure delivered by the pump 24 to the counterbalancing device 31 is adequate to support the weight of the tool slide and thus to permit greater freedom and rapidity of action in raising and lowering the tool slide by means of the piston and cylinder device 20.

The main pressure pump 23 is connected by means of a conduit 40 through a pressure relief valve 41. The pressure relief valve 41 is provided with a conduit 42 connected to the tank 29 and with a second conduit 43 which connects to one end of the piston and cylinder device 20. A branch conduit 44 connects the conduit 43 with the duplicator valve mechanism 21 and connects, through that mechanism, to conduits 45 or 46.

The conduit 46 is connected to the tank by conduit 47 through the medium of a back pressure valve 48 adapted to permit flow of fluid from the conduit 46 into the conduit 47 only when the pressure in the conduit 46 exceeds a predetermined amount. The conduit 45 leading from the duplicator valve mechanism 21 is connected to a conduit 50, through the medium of a tool lift valve 51, which latter conduit connects to the piston and cylinder device 20.

The hydraulic piston and cylinder device 20 includes a cylinder 52 having a piston 53 reciprocable therein. A piston rod 54 is connected to one side of the piston 53 and to the tool slide 14. It will be noted that the conduit 43 opens into the cylinder 52 on the rod side of the piston while the conduit 50 opens to the cylinder on the head side of the piston. It will thus be clear that should the duplicator valve mechanism 21 be so positoned as to direct the entire pressure received through the conduit 44 into the head end of the cylinder the effect will be to cause the piston 53 to move downwardly (as shown in Fig. 1) inasmuch as the area of the piston on the head side exceeds the area thereof on the rod side even though the hydraulic pressure delivered to both ends of the cylinder is equal.

The tool lift valve 51, which may be a simple fourway valve, is movable by means of a solenoid 60 connected thereto from a first position opening the conduit 50 to the pressure in the conduit 45 to a second position in which the conduit 50 is connected to a conduit 61 which, in turn, is drained to the tank 29. The tool lift valve includes an additional conduit 62 connected through a throttling valve 63 to the tank 29. The throttling valve functions only to control the speed of tool lifting and to cushion the force of the piston 53 as it strikes a stop (not shown) in the cylinder.

The tool lift valve and solenoid are so arranged as to expose the cylinder 52 on the head side of the piston to the pressure in the conduit 45 when the solenoid is energized, deenergization of the solenoid serving to permit a spring (not shown) to shift the tool lift valve to a position tanking pressure on the head side of the piston. Energization of the solenoid 60 is accomplished by means of a switch 65 responsive to pressure in the pilot circuit. To effect operation of the pressure responsive switch 65 it may be connected into the pilot pressure by means of the connection 66 shown, and the movable slide may be equipped in the usual manner with actuating dogs for directing pilot pressure to or from the pressure responsive switch at the end of each working stroke of the tool slide and again at the end of the return stroke.

A manual on-off switch 67 is provided in the electrical circuit intermediate the pressure responsive switch 65 and the solenoid 69 so that the tool slide can be raised by deenergizing the solenoid at any time during the cutting stroke of the tool slide.

From the foregoing it will be noted that in the event of failure of the electrical circuit, the machine tool will fail "safe." That is, as the solenoid is deenergized, which may occur automatically through the pilot pressure and pressure switch, manually through the operation of the switch 67, or accidentally through failure of the electrical circuit, the tool slide is raised relative to the work piece slide and thus damage to the machine and work piece is prevented.

Referring now to Fig. 2 of the drawings, the duplicator valve mechanism 21 comprises a casing 70 having a bore 71 closed at each end by end caps 72 and 73, in which bore there is press fitted a cylindrical sleeve 74. The sleeve is provided with a plurality of slots 75 which extend from the center of the sleeve in both directions toward, but not completely to, the ends thereof. Viewing Figs. 6 and 8, it will be noted that the slots 75, while extending completely through the sleeve but are not parallel with the axis of the sleeve but rather are slanted for purposes which will hereinafter become apparent.

Rotatably held within the sleeve is a rotor 80 which, as best seen in Fig. 5, is provided with end bearings 81 and 82 each having a plurality of oil retarding grooves 83 and a central portion 84 separated from the bearings 81 and 82 by annular grooves 85 and 86 respectively. An actuating shaft 90 is secured to one end of the rotor 80 and provided with splines 91 for attachment to an actuating arm of the tracer mechanism. The actuating shaft 90 extends through an opening 92 suitably provided in the end cap 73 and is sealed in fluid tight relationship thereto by the packing 93 as shown. The interior or left-hand side of the end plate 73 is provided with an annular oil-receiving recess for receiving oil leaking past the bearings 82 and directing the same through drilled passages 95 into a drain passage 96 which extends axially through the rotor 80 and connects at its left-hand end to a drain 97 formed in the left-hand end plate 72. Oil leaking past the other bearing 80 may enter the same drain passage 97 or the annular groove 85.

The face of the central portion 84 of the rotor is provided with a plurality of parallel longitudinal grooves. Alternate grooves 100 open at one end to the annular groove 86 and extend only a part of the distance towards the other annular groove 85 while the intermediate grooves 101 are reversely constructed to open at one end to the annular groove 85 and to extend only a part of the distance towards the annular groove 86.

Each of the slots in the sleeve communicate with an annular groove 102 formed in the bore 71, the annular groove connecting by means of a port 103 to the conduit 45. A second port 104 in the casing 70 connects through an opening 105 in the sleeve to the annular groove 86 and a third port 106 connects to the annular groove 85 through an opening 107 in the sleeve. It will be noted that the port 104 is connected to the conduit 44 while the port 106 is connected to the conduit 46.

The grooves and slots in the rotor and sleeve are so arranged that the slots are in communication with at least some of the grooves at all positions of the rotor. Pump outlet pressure is led, by means of the conduit 44, into a pump inlet chamber defined by the annular groove 86 at the right-hand end of the rotor. Pump pressure is delivered by means of the alternate grooves 100 to the slots in the sleeve to generate a pressure in the annular groove 102 which is less than the pressure of the pump, the degree of decrease in pressure being determined by the extent of the opening between the alternate grooves 100 and the slots. The annular groove 102 may also be connected to the intermediate grooves 101 which in turn open to the drain chamber defined by the annular groove 85 at the left-hand end of the valve. Hydraulic fluid in the drain chamber is led off by means of the conduit 46 through the back pressure valve 48 and thence into the tank, the pressure at which fluid is released from the drain chamber being, of course, determined by the setting of the back pressure valve.

As best shown in Figs. 2 and 3 the tracer mechanism includes a rod 110 having a ball 111 at its lower end adapted to roll on the template or pattern 13. The rod is vertically movable through suitable openings formed in brackets 112 and 113 secured to the duplicator valve mechanism 21. It is, of course, understood that the duplicator valve mechanism is secured to the work slide 14 as shown. A stop collar 114 is adjustably secured to the rod 110 and is provided with a finger portion 115 adapted to ride in a key-way 116 in the bracket 112 to prevent rotation of the rod with reciprocation of the tool slide. The rod 110 is provided with an annular grooved portion 117 in which rides the ball tip 118 of a control rod 119 which is secured to the shaft 90 of the duplicator valve. Vertical movement of the rod 110 in response to changes in the conformity of the template 13 serves to oscillate the arm 119 and hence to rotate the rotor 80 for the purpose of controlling the pressure delivered to the piston and cylinder device 20.

To insure that the ball tip 118 of the control rod is firmly seated against one edge of the groove 117, the upper end of the rod 110 is provided with a vertical drilled passage 120 in which a piston-like member 121 is reciprocable. The member 121 extends into the annular groove 117 and against the upper edge of the ball tip member 118 and is held thereagainst by means of an adjustable spring 122. The tension of the spring 122 may be adjusted by rotation of an adjusting nut 123 threadably secured in a collar 124 mounted on a bracket 125 secured to the upper bracket 113.

The operation of the control system just described is as follows. In neutral position, that is in the position wherein the tool slide is traversing the work piece slide to perform a cutting operation, the tool slide is held against vertical movement by the piston and cylinder device 20. The full output pressure of the pump is delivered to the cylinder 52 on the rod side of the piston by means of the conduit 43. In such neutral position the rotor is positioned relative to the sleeve as to direct a portion of the output pump pressure in the conduit 44 into the annular groove 102 through the grooves 100 and slots 75. The grooves and slots are not fully matched so that, in effect, a pressure reducing orifice is created in the connection between the pressure inlet chamber and the annular groove 102. A constant bleed off of the pressure through the back pressure valve 48 is effected by a slight overlap of the grooves 101 and the slots 75, the effective pressure drop in the output pressure of the pump as delivered to the conduit 45 being such as to equalize the pressure in the rod end of the cylinder. Should the rod 110 of the tracer mechanism move upwardly in response to an upward curvature of the template, the rotor is rotated so as to increase the opening between the slots 75 and the grooves 101 while simultaneously decreasing the size of the opening between the grooves 100 and the slots 75 to cause a drop in the pressure of the fluid directed into the conduit 45. This unbalancing of pressures in the cylinder 52 causes the piston 53 to move upwardly, and the fluid displaced in the head end of the cylinder is directed to the tank through the grooves 101 and conduit 46. As the piston 53 moves upwardly the slide 14 and valve mechanism 21 also move upwardly relative to the tracer 110, thus causing rotation of the rotor in the opposite direction returning the valve toward the neutral position. If, on the other hand, the shape of the template should cause the tracer control rod 110 to move downwardly a reverse condition is created in which the grooves 100 are brought into closer matching relationship with the slot 75 thereby increasing the size of the orifice connection causing a pressure rise in the head end of the cylinder 52. Due to the unequal areas at the head and rod ends of the pistons such increase in pressure serves to move the piston downwardly. Rapid downward movement is effected by reason of the fact that the fluid displaced at the rod end of the cylinder is added to the fluid delivered to the head end through the duplicator valve. Again, downward movement of the slide and valve causes rotation of the rotor back toward neutral position.

The angularity of the slots in the sleeve effects an overlap of the slots and grooves together with a shearing effect in the connection between the slots and the grooves. This shearing effect provides a very accurate adjustment of orifice size so that accurate metering may be effected. The amount of angularity of the slots may be varied, of course, according to the particular duty requirements.

At the end of a working stroke, a drop in pilot pressure deenergizes the solenoid 60 through the pressure responsive switch 65 to tank pressure in the head end of the cylinder, whereupon the pressure at the rod end serves to raise the tool slide prior to the return stroke. At the end of the return stroke, pilot pressure is again directed to the switch 65 to energize the solenoid and lower the tool to cutting position.

We claim:

1. Apparatus of the character described comprising a valve having a bore, means defining a fluid chamber at each end of the bore, means connecting one of said chambers to a drain and means connecting the other of said chambers to a source of fluid under pressure, a rotor in the bore having a plurality of parallel longitudinal grooves each extending from a chamber only a part of the distance toward the other chamber, with alternate grooves opening to one chamber and with intermediate grooves opening to the other chamber, a sleeve in the bore and in which said rotor is positioned, said sleeve having a plurality of parallel slots extending therethrough and slanted with respect to the grooves, and an annular groove in the bore and communicating with the slots said slots being so arranged as to constantly communicate with at least one intermediate and one alternate groove when the valve is in neutral position, rotation of the rotor in the sleeve serving to vary the matching overlap of the slots and grooves with the slant of the slots regulating the amount of change of said overlap with a given rotation of the rotor.

2. Apparatus of the character described comprising a valve having a bore, means defining a drain chamber at one end of the bore and a pressure inlet chamber at the other end of the bore, means connecting the drain chamber to a drain, means for connecting the pressure inlet chamber to a source of fluid under pressure, a rotor in the bore having a plurality of parallel longitudinal grooves with alternate grooves opening at one end to the pressure inlet chamber and extending along the face of the rotor only a part of the distance toward the drain chamber and with intermediate grooves opening at one end to the drain chamber and extending along the face of the rotor only a part of the distance toward the pressure inlet chamber, a sleeve in the bore having a plurality of parallel slots extending through the sleeve and slanted with respect to the grooves, there being a greater number of grooves than slots and at least some of said slots being so arranged as to be constantly in communication with either an adjacent alternate or intermediate groove when the valve is in neutral position, and an annular groove in the bore and communicating with the slots.

3. Apparatus of the character described including a valve having a bore, means defining a fluid chamber at each end of the bore, means for connecting one of said chambers to a drain and for connecting the other of said chambers to a source of hydraulic fluid under pressure, a rotor in the bore having a plurality of parallel longitudinal grooves each extending from a chamber only a part of the distance toward the other chamber, with alternate grooves opening to one chamber and with intermediate grooves opening to the other chamber, a sleeve in the bore and surrounding the rotor, said sleeve having a plurality of parallel slots extending therethrough and slanted with respect to the grooves, said slots being so arranged as to be constantly in communication with at least one alternate and one intermediate groove when the valve is in neutral position, and an annular groove in the bore and communicating with the slots rotation of the rotor in the sleeve serving to vary the matching overlap of the slots and grooves with the slant of the slots regulating the amount of change of said overlap with a given rotation of the rotor.

4. A fluid control system comprising a hydraulic piston and cylinder device, said piston having opposed sides unequal in area, a source of hydraulic fluid under pressure, means connecting the source to the cylinder on the smaller side of the piston for constantly urging the piston toward movement in one direction relative to the cylinder, a metering valve having a bore, means defining a fluid chamber at each end of the bore, means for connecting one of said chambers to a drain and for connecting the other of said chambers to said source of hydraulic fluid under pressure, a rotor in the bore having a plurality of parallel longitudinal grooves each extending from a chamber only a part of the distance toward the other chamber with alternate grooves opening to one chamber and with intermediate grooves opening to the other chamber, a sleeve in the bore having a plurality of parallel slots extending through the sleeve and slanted with respect to the grooves, at least some of said slots being so arranged as to be constantly in communication with at least one alternate and one intermediate groove when the valve is in neutral position, an annular groove in the bore communicating with the slots, an outlet for the valve communicating with said annular groove, means connecting the outlet to the cylinder on the larger side of the piston, and means for rotating the rotor in either direction to vary the fluid pressure transmitted by said grooves and slots to the outlet.

(References on following page)

References Cited in the file of this patent

UNITED STATES PATENTS

| | | |
|---|---|---|
| 1,529,434 | Hynes | Mar. 10, 1925 |
| 1,585,529 | Boving | May 18, 1926 |
| 1,773,794 | Schneider | Aug. 26, 1930 |
| 1,912,184 | Ferris | May 30, 1933 |
| 2,088,520 | Huguenin | July 27, 1937 |
| 2,164,971 | Vickers | July 4, 1939 |
| 2,311,987 | Jackson | Feb. 23, 1943 |
| 2,331,443 | Von Zelewsky et al. | Oct. 12, 1943 |
| 2,347,346 | Wright | Apr. 25, 1944 |
| 2,349,641 | Tucker | May 23, 1944 |
| 2,351,263 | Harrington | June 13, 1944 |
| 2,395,671 | Kleinhans | Feb. 26, 1946 |
| 2,437,570 | Von Zelewsky | Mar. 9, 1948 |
| 2,484,553 | Carson | Oct. 11, 1949 |
| 2,568,254 | Purcell | Sept. 18, 1951 |
| 2,618,244 | Roehm | Nov. 18, 1952 |
| 2,619,794 | Lombard | Dec. 2, 1952 |

FOREIGN PATENTS

| | | |
|---|---|---|
| 67,299 | Norway | Jan. 17, 1944 |